Patented Nov. 30, 1943

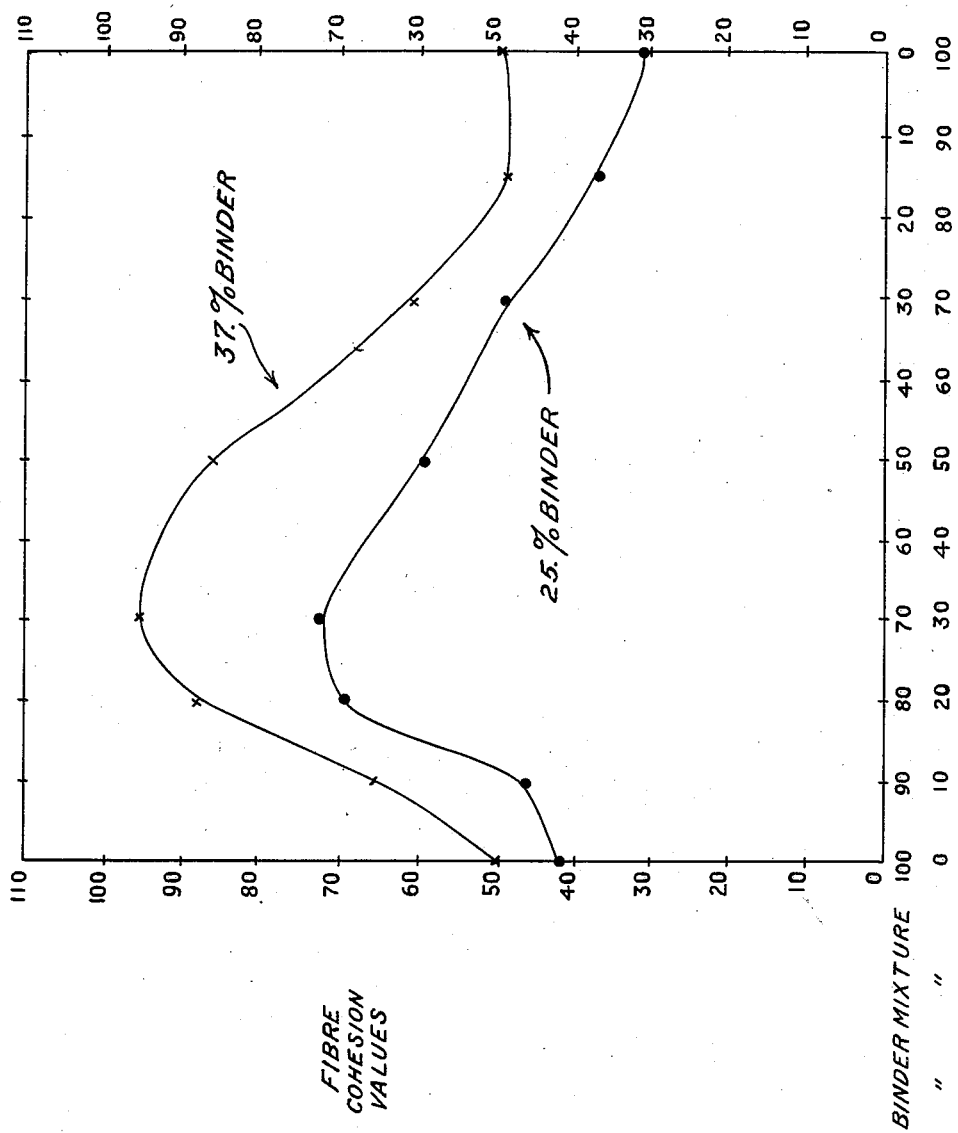

2,335,702

UNITED STATES PATENT OFFICE 2,335,702

ARTIFICIAL LEATHER MANUFACTURE

Milton O. Schur and Edward M. Archer, Berlin, N. H., assignors to Brown Company, Berlin, N. H., a corporation of Maine Application April 2, 1942, Serial No. 437,320

6 Claims. (Cl. 117—140)

This invention relates to the impregnation of felted cellulose fiber stock to produce material adapted for use as artificial leather and other uses, including the manufacture of innersoles, counters, belts, etc.

It is an object of the invention to produce an improved impregnated product and process of making same.

In accordance with one phase of this invention, a water-laid cellulose fiber base is impregnated with a starch-rubber composition in which the ratio of starch to rubber is controlled within certain limits for a purpose to be presently described. The most convenient manner of performing this operation so far employed is to impregnate the base with a suspension of the starch-rubber composition in an aqueous medium. This suspension may be obtained by mixing the starch suspension with a colloidal dispersion of a rubber or rubber-like substance in an aqueous medium, e. g., rubber latex, neoprene, Thiokol, elastic methacrylate polymers and elastomers in general. A convenient way of effecting the impregnation is to pass a dry cellulose sheet or web through a bath of the aqueous dispersion of elastic binder-starch composition. The impregnated web is then preferably dried. Two or more of such dried sheets may be united by pressing together with the aid of a suitable adhesive.

One of the important objectives of this invention is to obtain a high degree of cohesion between the individual fibers. This property may be quantitatively expressed in terms of the results of a test conducted as follows:

Specimens of the finished sheet in the form of half-inch strips about four inches long are cut from the sheet or stock in both the "with" and "across" directions in the sense that the quoted expressions are understood in papermaking circles. With the aid of a razor blade, a split is started at one end of each strip parallel to the face of the strip; and the force necessary to continue the splitting is determined in a tensile-strength testing machine, the gripper jaws of which are pulled apart slowly. The value, as expressed herein, represents one-third the average force in grams necessary to continue the splitting in the testing machine.

Although those skilled in the art use the word "ply" in referring to this test, that word tends to cause confusion because it has nothing to do with the "plies" obtained by uniting a plurality of webs to secure stock of the desired thickness. A more significantly descriptive and less confusing name is "fiber cohesion value" and this phraseology will be used hereinafter. The laminating operation has little or no effect on this value.

When a given fiber base is impregnated with rubber alone the resulting product has a definite fiber cohesion value and the same is true if the same base is impregnated with starch alone, the proportions of rubber and starch being the same on the basis of the dry weight of the base. For example, a certain specific base impregnated with about 25 percent by weight of rubber has a fiber cohesion value of about 40, and the identical base impregnated with a specific cooked starch has a value of about 30.

It would be expected that if the same base were impregnated with 25 percent by weight of mixtures of the same rubber and the same starch that the fiber cohesion values of the product would be intermediate between 30 and 40.

Contrary to such expectation, values have been obtained which are not intermediate and a curve connecting these values shows radical deviations from the expected values.

The invention will therefore be further described by reference to the drawing showing fiber cohesion values for various starch-rubber compositions. The abscissae of these curves represent the proportions of starch and rubber in the starch-rubber composition with which the fiber base is impregnated. The ordinates show the corresponding magnitude of the fiber cohesion values. Referring to the curve marked 25.0% binder (binder meaning starch-rubber composition), the fiber cohesion value of the stock carrying 25 percent of rubber alone is about 40 and that of the stock in which starch alone is used as binder in the same proportion (25 percent) is about 30. The points intermediate these values show the fiber cohesion values of the same stock or fibrous base carrying 25 percent of starch-rubber mixture compositions. As the proportion of starch to rubber increases, the fiber cohesion values, instead of decreasing, undergo a sharp increase reaching a maximum with a composition containing about 30 percent starch and 70 percent rubber and then decrease. The curve marked 37.0% binder is of the same general type.

The data on which the values shown in the drawing are based were obtained in the following manner:

24 grams of tapioca starch were mixed with 352 grams of water. To this mixture was added 13.5 grams of hypochlorite bleach liquor containing 1.44 grams of available chlorine, which is equivalent to 6% of available chlorine based on starch. This mixture of starch, water and bleach liquor was then heated to 176° F. within 8 minutes, and was then immediately reduced in temperature by the addition of 352 grams of water, the amount predetermined to bring the final total solids in the mix to 12%. This partially cooled starch suspension was then cooled further to 70° F. and an arbitrary viscosity value determined by noting the time for a definite amount to flow through a capillary tube. The time of outflow in this case was 14 seconds. The time for the same quantity of water was 10 seconds, and the corresponding time for the normal 37% solids latex of commerce was 16 seconds. To this treated starch mixture 259 grams of normal latex (37% solids), equivalent to 96 grams of rubber, were added so that the proportion of starch to total starch-rubber solids was about 20 percent. The mix was then used to impregnate a water-laid web having a compactness of 37 and made from purified kraft pulp. A series of impregnations was made with this mix as prepared and also after dilution with water to give a range of total solids concentration and consequently a range of binder content in the impregnated dried web.

The web used for impregnation was made on a paper-making machine in the usual manner, from purified kraft pulp, except that no pressure was applied to the wet web and the pulp was not hydrated or beaten. The finished dried web had a compactness of about 37. Compactness is a number equal to the weight in pounds of 2880 square feet of material having a thickness of 0.01 inch, i. e., it is the basis weight divided by 100 times the thickness expressed in hundredths of an inch. It was passed through the impregnation bath, dried and then tested for its fiber cohesion value. These values were then plotted as ordinates against the binder content of the web (percent of solids therein based on the fiber) as abscissae and the result was found to be a straight line function, i. e., as the binder content of this particular mixture increased, the fiber cohesion value also increased.

The tests were then repeated using the same starch, the same type of treatment, the same rubber latex and maintaining all other conditions the same except that the ratio of starch to rubber was varied and the bleach usage varied to maintain the viscosity of the mix at between about 12 and 16 seconds. Thus a series of straight line functions was obtained showing the variation of fiber cohesion values with total starch-rubber solid content in the dry web, for rubber-starch compositions in which the percentage of starch varied from 0 to 100.

From this series of straight line functions, the curves of the drawing were constructed showing the relation between the ratio of starch to rubber and the fiber cohesion value, in two typical cases, to wit, total starch-rubber binder content of 25 and 37 percent, respectively. For other binder contents, the type of relationship is similar.

It will be seen that by using proportions of starch to total starch-rubber solids between about 10 and 70 percent, that fiber cohesion values materially greater than those obtainable with rubber or starch alone may be realized, these values being also materially greater than those obtainable with ratios outside those limits. A still narrower preferred range is about 15 to 50. Within the gamit of this invention and the discoveries on which it is based, these ranges are employed.

The range of total binder content based on the dry weight of the fiber may vary through a wide range, e. g. 15 to 100 percent, a preferred range being about 25 to 40 percent.

Other important properties to the securing of which this invention is directed, include flexibility, resiliency and sufficient porosity to provide free "breathing" quality (possessed to a remarkable degree by natural leather) as well as leathery "feel" or "hand." In securing such properties, it has been found that control of compactness of the web to be impregnated is necessary.

In accordance with this invention, the compactness of the web to be impregnated is controlled between about 25 and 55. To obtain this range of compactness the wet web hereof is, on this account, caused to by-pass the press rolls of the papermaking machine or to undergo very little pressing by such rolls. Indeed, it need receive only the relatively low pressure of the usual felt-covered cushion roll of light weight, which, as it rides under its own weight on the wire-supported web after the web has passed over the customary suction boxes, serves to consolidate the wet web sufficiently to permit its removal from the wire and its transfer in intact condition to the dry end of the papermaking machine. By operating the papermaking machine as herein described in producing the finished sheet hereof, it is possible to realize a finished sheet of the desired compactness.

In securing the desired restriction of the range of compactness, it is frequently helpful to avoid any substantial hydration of the pulp in the beater.

In the impregnation of webs having a compactness within the restricted range herein set forth, a serious problem arose. The starch was "cooked" by heating with water at about 185° F. and to this cooked starch, without further treatment, there was added a suitable proportion of rubber latex. Upon continuously passing the web through the impregnation bath it was found that the composition thereof changed, the proportion of starch to rubber therein gradually increasing. Upon investigating this phenomenon it was further found that there was a selective absorption of one of the components, i. e., the rubber was absorbed preferentially in relation to the starch. A separation or filtration of starch on the surface of the web was discovered.

This problem was solved by subjecting the starch to a preliminary conditioning treatment which reduces the particle size enough to prevent the separation or filtration phenomenon without impairing its binding qualities for the purposes hereof. Such effect can be secured by passing the starch through a colloid mill or by treating the starch with an oxidizing or hydrolyzing reagent or with a suitable enzyme or, in general, subjecting it to any mechanical or chemical treatment which will mechanically or chemically break down the particles and decrease the size thereof just enough to permit their free entry into the interstitial spaces between the fibers to cause, as a part of the starch-rubber composition, adequate deposition upon and union of the fibers.

In accordance with that aspect of the invention which arose out of the solution of this problem, a water-laid web is impregnated with starch-rubber combinations in general or even with cooked starch alone where the starch has previously been homogenized, as herein defined, to permit its satisfactory penetration, in continuous impregnation, into the interstitial fiber spaces.

The invention will be further described by supplying a typical example of an embodiment of the process of the invention, which embodiment may be employed to obtain an embodiment of the product of the invention.

The preparation of the starch solution and its admixture with the rubber latex is carried out in a mixing tank equipped with an agitator and a steam jacket. The tank is charged with 25 pounds of tapioca starch and 633 pounds of water and, after the starch has been dispersed or admixed with the water, 2½ pounds of hypochlorite bleach liquor containing about 10 percent available chlorine is added to the aqueous mixture and the mixture is gradually heated by the steam jacket to a temperature of 185° F. as it is being agitated. The steam supply to the jacket is then shut off and 633 pounds of water is added to the cooked and homogenized starch solution to cool and dilute it. To the resulting starch solution is then added 383 pounds of the usual ammonia-preserved rubber latex of commerce containing 37 per cent of latex solids or 140 pounds of rubber. It is preferable also to add a little anti-oxidant to the mixture; and, if desired, dye or other coloring agent may be added thereto. The resulting composition, which contains 10 percent of starch plus rubber in the ratio of approximately 16 parts of starch to 84 parts of rubber, is fed to an impregnating tank to form a bath through which a felt of cellulose fibers is being progressively drawn from a suitable supply source. Typically, the felt may be one produced on a papermaking machine and having a basis weight of 120 pounds and a caliper of 0.031 inch. After leaving the bath in the impregnating tank, the substantially uniformly impregnated web passes through press rolls wherein it undergoes mild pressure to remove excess liquor, and it progressively emerges from the press rolls with a total impregnant solids content of about 25 percent, based on the weight of dry fiber. The pressed impregnated web is progressively dried, as in the usual air-heated festoon drier. When three plies or layers of the dried impregnated sheet are united by suitable adhesive in superposed or face-to-face relationship, they afford a laminated structure for cutting or dieing out into 3-iron insoles. The dried impregnated sheet may, of course, be useful as single-ply or multi-ply structure, depending upon the uses to which it is to be put.

Instead of natural rubber, synthetic rubber-like polymers or elastomers in general may be employed. Instead of tapioca starch, starches in general may be used.

In the claims we use the word "rubber" to include synthetic rubber-like polymers, and by "homogenized starch" we mean starch which has been treated mechanically (as by means of a colloid mill) or chemically, as with an oxidant, or with an enzyme to reduce the particle size enough to permit continuous operation without accumulation of starch in the impregnating bath and without substantial loss in binding quality.

This application is a continuation-in-part of our copending application Serial No. 157,780, filed August 6, 1937.

We claim:

1. Impregnated cellulose sheet material adapted for use as artificial leather and other purposes comprising a felted cellulose fiber base of compactness about 25 to 55 impregnated with a composition of a homogenized starch incorporated with a rubber latex, the proportion of homogenized starch in said composition varying between about 10 and about 50 percent by weight of the total solids.

2. Impregnated cellulose sheet material adapted for use as artificial leather and other purposes comprising a felted cellulose fiber base impregnated with the dried residue of a composition of a homogenized starch incorporated with a rubber latex, the proportion of starch in said residue composition varying between about 10 and about 50 percent by weight.

3. Impregnated cellulose sheet material adapted for use as artificial leather and other purposes comprising a felted cellulose fiber base impregnated with the dried residue of a composition of a homogenized starch incorporated with a rubber latex, the proportion of homogenized starch in said residue composition varying between about 15 and about 50 percent by weight.

4. Impregnated cellulose sheet material adapted for use as artificial leather and other purposes comprising a felted cellulose fiber base impregnated with the dried residue of a composition comprising a homogenized starch incorporated with a rubber latex, the proportion of homogenized starch in said residue composition varying between about 10 and about 50 percent by weight, said sheet material having a fiber cohesion value between about 55 and 95.

5. The process of making an impregnated cellulose sheet material which comprises passing a water-laid felted cellulose fiber base having a compactness value of about 25 to 55 through a composition composed essentially of a homogenized starch solution incorporated with a rubber latex and in which the proportion of starch varies between about 10 and about 50 percent of the total solids by weight, said starch having been homogenized until the size of the particles thereof have been reduced to such an extent that there is substantially no filtration of said particles on the surface of said base, but without impairing to a serious extent the binding properties of the starch.

6. Impregnated cellulose sheet material comprising a felted cellulose fiber base having a compactness value of about 25 to 55, impregnated with the dried residue of a composition consisting essentially of rubber latex and homogenized starch, the proportion of starch in said composition varying between about 15 and 50 percent by weight.

MILTON O. SCHUR.
EDWARD M. ARCHER.